W. SCHELLENBACH.
REVOLVING STEADY REST.
APPLICATION FILED JAN. 13, 1913.
1,067,143. Patented July 8, 1913.
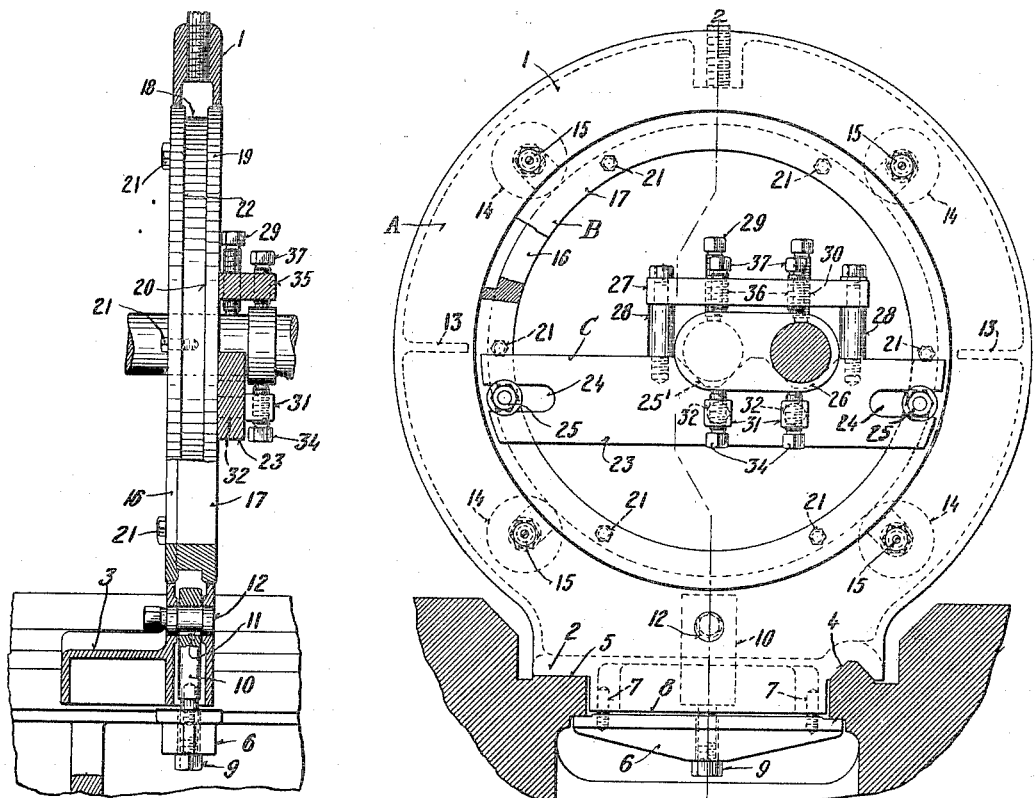
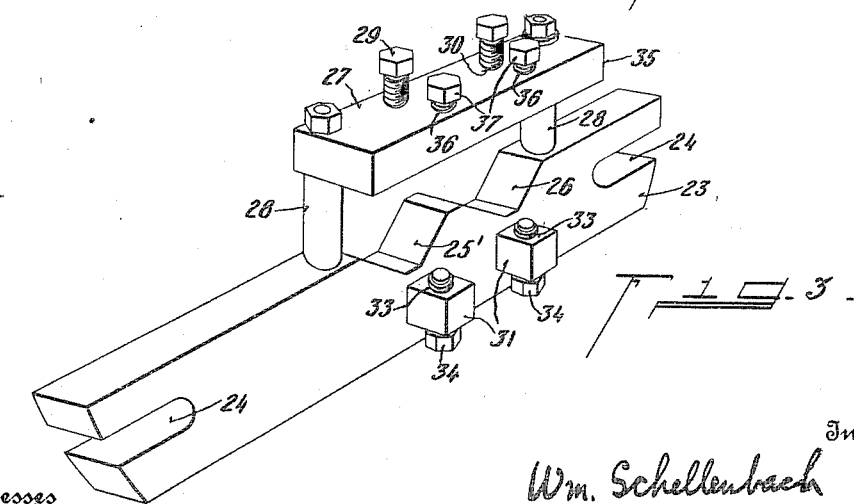

UNITED STATES PATENT OFFICE.

WILLIAM SCHELLENBACH, OF HARTWELL, OHIO, ASSIGNOR TO THE LODGE & SHIPLEY MACHINE TOOL COMPANY, OF CINCINNATI, OHIO, A CORPORATION OF OHIO.

REVOLVING STEADY-REST.

1,067,143.        Specification of Letters Patent.        Patented July 8, 1913.

Application filed January 13, 1913. Serial No. 741,739.

*To all whom it may concern:*

Be it known that I, WILLIAM SCHELLENBACH, a citizen of the United States, residing at Hartwell, in the county of Hamilton and State of Ohio, have invented certain new and useful Improvements in Revolving Steady-Rests, of which the following is a specification.

This invention deals with improvements in "steady-rests" and it proposes an arrangement facilitating the bracing of work rotating between centers to promote efficiency and accuracy in "turning" the same.

One object within the contemplation of the invention is to render available a simple contrivance for positively maintaining the normal alinement of intermediate parts of a relatively long piece of work, such as a crank-shaft, while the same is being tooled, as in a lathe.

Another object is to create an instrumentality comprising a member capable of being gripped to an intermediate part of the work, (irrespective of whether such part is unfinished or rotates eccentrically with the lathe-centers) and so mounted that it will brace the work against springing under the pressure of the lathe-tool, and do so in all radial directions so that in no position of its rotation will the thrust of the tool be inadequately resisted.

Another object is to devise a means that may be speedily applied to the work to reinforce the same, while yet permitting rotation, but without giving rise to a material amount of rotary friction, even under heavy cuts of the cutting tool.

Other objects will be in part obvious from the accompanying drawings and will be in part indicated in the following description.

In order that this invention may be so fully revealed as to enable others diversely to embody it under widely different applications, drawings exemplifying a typical embodiment thereof have been appended as a part of this disclosure, and in such drawings like characters of reference indicate corresponding parts throughout the various views, of which:—

Figure 1 is an elevation partly in section looking along the center-line of a lathe from the tail-stock, showing the adapter swung into a horizontal position and secured to a crank-pin as well as to a "cheek" of a crank-shaft. Fig. 2 is a front view, partly in elevation and partly in section, showing the clamp-screws mounted on the adapter taking hold of a pin and a "cheek" of a crank-shaft; and also showing details in the construction and mounting of the various parts. Fig. 3 is an isolated perspective of the adapter and its parts.

Continuing now by way of a more detailed description, it may be noted that this invention preferably combines three major elements, (A) the annular standard providing bearing-elements concentrically distanced from the lathe axis, (B) the spider freely journaled in said standard and open in its central region to accommodate the work, and (C) the adapter having a clamp capable of initially seizing the work while in any unrestrained or haphazard radial relation with the spider, and having means for thereupon firmly securing it in any resultant position to the spider to maintain the work against springing while tooling.

The annular standard A is for the purpose of mounting this device accurately in concentric relation with the center-line of a lathe, and for providing a free-turning bearing for the work clamping and bracing instrumentalities. It comprises a hoop-like portion 1 preferably cast with a base portion 2 having a lateral extension 3 for the purpose of better securing the same to a lathe-bed to prevent side-sway. The base portion 2 may provide a V-shaped channel 4 and a surface 5 for mounting it on the guides of a lathe-bed, it being understood that these features are purely conventional and will vary in accordance with the different patterns of lathes. For the purpose of facilitating the attachment of the base of the standard to the lathe-bed, an underlying clamp block 6, arranged to straddle the under side of the lathe bed, is guided by the pin 7 projecting from the part 8 that extends downwardly between the front and rear walls of the lathe-bed. The bolt 9 attaches this clamp-block 6 to a pull-block 10 having an aperture 11 through which passes the eccentric or cam bolt 12 that is journaled in the walls of the base 2, so that, by turning the bolt 12, the parts 9 and 10 will be put under tension to draw the straddle clamp-bar 6 against the under side of the lathe-bed and thus firmly clamp the base of the standard onto the same. This device may be operated very quickly and conveniently. The aforesaid base is so proportioned with relation to the annular part 1 of the standard that when it is clamped in place on the lathe bed, the part 1 will be brought exactly into co-axial alinement with the lathe-centers. For the purposes of lightness, this annular portion 1 may be cast with an interior circumferential channel, and it may be reinforced by suitable ribs 13. Preferably, this invention proposes suitable anti-friction elements between the standard and a hoop-like spider that is journaled therein, and to that end, a series of hardened rollers 14 are positioned between the said walls of the annular portion 1 and are equi-spaced circumferentially, and are all arranged at exactly the same distance from the center-line 0 of the lathe, by means of the hardened journal pins 15. These rollers are utilized, not only for the purpose of maintaining the rotative ring or spider in absolute concentricity with the center-line of the lathe, but for also relieving it of the greatest possible amount of friction and furthermore for holding said ring in the annular standard and preventing it from having any lateral movement relative thereto. This last-mentioned capacity is in this instance attained by making the rollers 14 project inwardly a slight distance from the inner periphery of the annular standard, and causing them to enter into a snug fit within the circumferential groove provided by the rotating spider or ring, as will now be explained.

The rotary spider B is the element that intervenes between the stationary standard and the member that clamps directly to the work and which enables such member (independently of its absolute position in space) to be restrained to a rotation about the center line of the lathe. This so-called spider, preferably, has its central portion largely or entirely open or cut away so as to enable it to entirely clear the parts of a crank-shaft when moved laterally. The form shown has an annular or ring-like shape and is accurately journaled in the standard by means of the rollers 14 as aforesaid, and in point of detail in construction, it is preferably built up of two rings 16 and 17. The front ring 17 provides a circumferential track 18 for the periphery of a roller 14, and it also provides a flange 19 furnishing a side-face 20 adapted to bear against the side of the said roller and thus limit the lateral movement of the ring 17. The complementary ring 16 is attached to the ring 17 by means of bolts 21 and it corresponds in proportion to the flange 19 and provides the lateral annular bearing face 22 to limit the movement of the ring in the other direction. When the standard and its component parts have been assembled, the ring 17 is slipped into place and the complementary back ring 16 is then secured to its companion by means of a bolt 21, and it will thus be perceived that the anti-friction roller elements 14 not only support this rotary ring or spider by constituting an efficient anti-friction bearing, but also that these rollers maintain this spider in axial coincidence with the lathe centers, as well as preventing any side play thereof. In other words, they alone, and exclusively, determine the absolute position of the spider. This spider is shown constructed so as to be relatively narrow, like the annular standard, so as to consume but little room laterally and permit its use in confined spaces. The means instrumental in enabling the work to be clamped indirectly to this spider in a positive rigid manner, will now be explained.

The clamp adapter C is a member intervening between the spider and the work and is capable of being securely attached to the work, while quite free of restraint by the spider, and of being thereupon secured to the spider in whatever position or relation therewith may have been predetermined in consequence of its attachment to the work. This self-adapting capacity has been provided so as to permit work that is irregular or eccentrically located to be clamped and held "on centers" without trouble. This element is therefore in the nature of a normalizing or compromising interponent that establishes a definite fixed relation between the work and the spider, without however requiring the work to be twisted or strained into any abnormal position. In this instance the adapter provides a radius bar 23 having at its extremities slots 24 that are adapted to receive the shanks of the bolts 25, whereby it is freely adjustably secured to the spider. This device, being primarily constructed for steadying crank-shafts while they are being finished, is therefore so designed that it may take hold of a journal of a crank-shaft, or of a pin of a crank-shaft, as well as the "cheek" of the same. In putting this into practice, the radius bar 23 provides a clamp socket 25' for a main journal of the crank-shaft, as well as a similar clamp-socket 26 located off-center for a pin. These sockets are arranged at one side of a diameter line of the spider, and the crank-pin or journal as the case may be, is clamped into this socket by clamp-screws mounted on a plate 27 that is detachably secured to the radius bar 23 by means of the studs 28. This plate provides a clamp-screw 29 directly opposite the clamp-socket 25, and similarly it provides a screw-hole 30 for a clamp-screw opposite the crank-pin socket 26. By this arrangement, either a crank-pin or a journal may be tightly clamped to the radius-bar 23. Preferably, however, means are also provided for clamping a "cheek" of a crank-shaft so as better to prevent the pin or journal from slipping in its socket, and otherwise to insure a more effective grip of the crank-shaft. To that end, square-headed dogs 31 may be driven into apertures 32 in the side of the radius-bar 23 and keyed therein so as to prevent them from turning therein. The heads of these dogs are provided with screw-threaded holes 33 in which clamp-screws 34 are mounted. The plate 27 has an off-set portion or wing 35 that has apertures 36 in alinement with the apertures 33 in the dogs and mount clamp-screws 37. It will be perceived that the clamp-screws for the pins are in a different plane than the clamp screws for the "cheeks" so that the latter may be clamped simultaneously with a pin or journal, as the case may be. This construction for the adapter is light and enables the same to be handled with facility. When it is desired to attach the same to the work, the standard and spider carried thereby may be brought into place, with the adapter loose, and the latter is first firmly clamped to the work and thereafter tightly affixed to the spider, thus preventing the normal status of the work from being disturbed by a deflection of the work under the pressure of the tool.

It will thus be seen that this invention is well adapted to achieve the objects aforesaid and that it possesses many advantageous capacities making for rapidity as well as accuracy in the commercial production of crank-shafts and the like. Any intermediate point of a crank-shaft, such as a pin or main journal (whether rough or finished), may be rigidly maintained in its normal position by positively resisting all warping or springing strains resulting from the pressure of the cutting tool, and very little trouble is occasioned and but few manipulations are required in setting up and accurately adjusting the apparatus.

In operation, all side pressures are resisted by the anti-friction rollers intervening between the spider and the standard; so that there is no tendency to chatter or create undue friction in taking heavy cuts, as is the case with ordinary rests which maintain a stationary jaw in sliding contact with some intermediate point of the work. Even though the gripped portion of the work should be off-center, the rubbing or sliding contact is distributed widely on the smooth and well-finished periphery of the spider thus promoting a smooth and free rotation and avoiding the local and rough contacts inhering to ordinary center-rests.

Without further elaboration, the foregoing will so fully reveal the gist of this invention that others may readily apply current knowledge in adapting it for various uses and preferences, without omitting features that, from the aspect of the prior art, fairly constitute essential characteristics thereof, and therefore such adaptations should and are intended to be comprehended within the range of equivalency of the following claims:—

Having thus fully revealed my invention, I claim as new and desire to secure by Letters Patent of the United States:—

1. A steady-rest of the nature disclosed combining a narrow annular standard having a base portion for mounting it concentrically with and between the centers of a lathe, a narrow spider journaled in and circumscribed by said standard and having a central opening of relative large diameter, a member adapted to be clamped to an intermediate part of the work, and means enabling said member to be finally fixed to said spider in the position predetermined by its attachment to the work.

2. A crank-shaft steady-rest of the nature disclosed combining a narrow standard having an enlarged annular opening and a base portion for mounting it with said opening concentric with the centers of a lathe, a narrow annular spider concentrically arranged within said opening, rollers intervening between the periphery of said spider and that of said opening and operating in grooves in one of said parts to determine its relation to the other, a member adapted to be clamped to an intermediate part of the work between the lathe centers, and means enabling said member to be adjustably fixed to said spider in any position predetermined by its attachment to the work.

3. A steady-rest of the nature disclosed combining an annular standard adapted to be mounted in concentric relation with and between the centers of a lathe, a spider providing a large central opening and revolubly journaled in said standard, and a member having a clamp-socket for gripping a pin of a crank-shaft and also having means for gripping the cheek thereof, and adapted to be adjustably secured to said spider to fix said socket in any predetermined axial relation with said spider.

4. A steady-rest of the nature disclosed combining a narrow annular standard having a base portion for mounting it concentrically with and between the centers of a lathe, a narrow spider in and circumscribed by said standard and having a central opening of relative large diameter, a member adapted to be clamped to the cheek of a crank-shaft, and means enabling said member to be finally fixed to said spider in the position predetermined by its attachment to said crank-shaft.

5. A crank-shaft steady-rest of the nature disclosed combining a narrow standard having an enlarged annular opening and a base portion for mounting it with said opening concentric with the centers of a lathe, a narrow annular spider concentrically arranged within said opening, rollers intervening between the periphery of said spider and that of said opening and operating in grooves in one of said parts to determine its relation to the other, a member adapted to be clamped to the cheek of a crank-shaft mounted between the lathe centers, and means enabling said member to be adjustably fixed to said spider in any position predetermined by its attachment to the work.

In testimony whereof, I have hereunto set my hand.

WILLIAM SCHELLENBACH.

Witnesses:
 OLIVER B. KAISER,
 CLARENCE B. FOSTER.